March 8, 1932. E. G. LOOMIS 1,848,572
VACUUM MIXING MACHINE
Filed Oct. 24, 1928
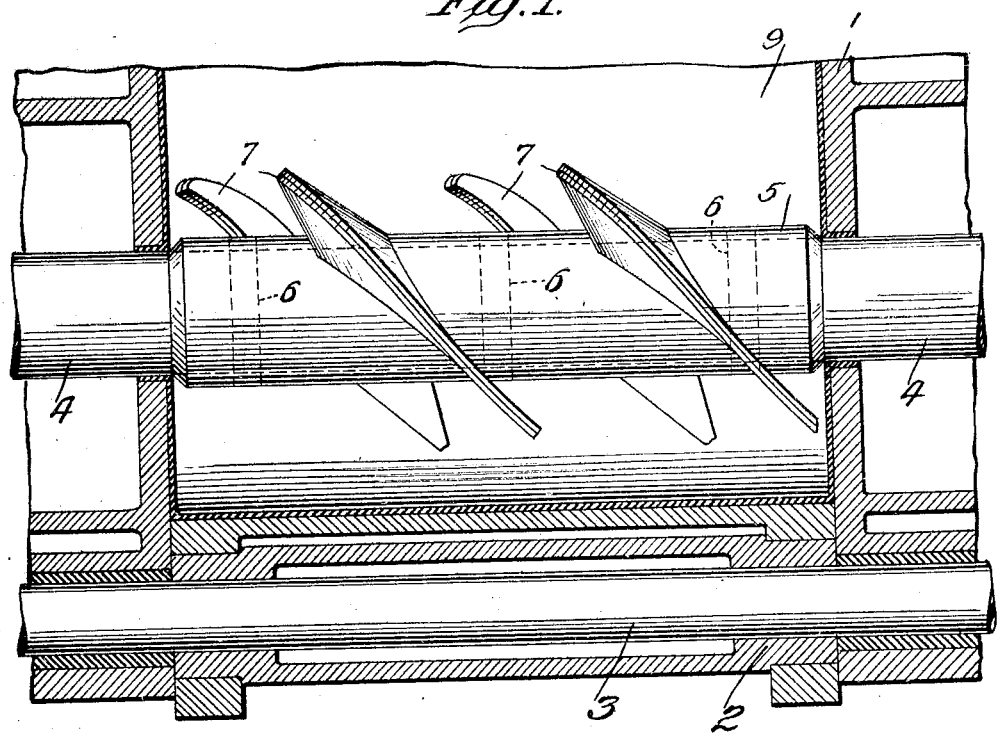
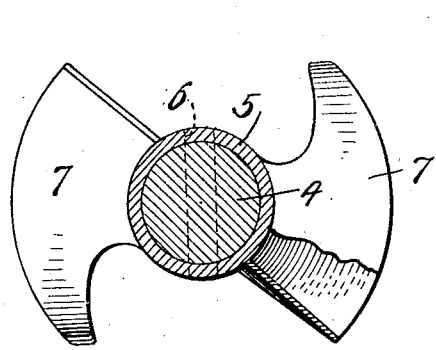
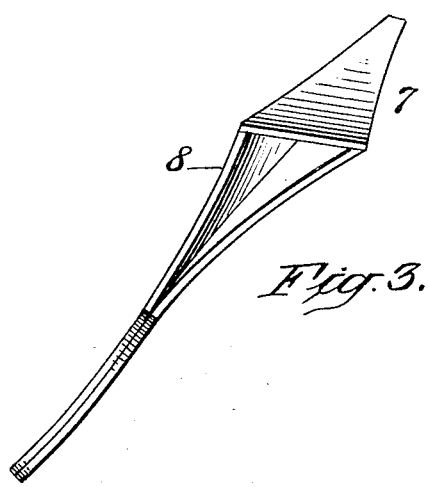
INVENTOR
EVARTS G. LOOMIS
BY
ATTORNEY Patented Mar. 8, 1932

1,848,572

UNITED STATES PATENT OFFICE

EVARTS G. LOOMIS, OF NEWARK, NEW JERSEY

VACUUM MIXING MACHINE

Application filed October 24, 1928. Serial No. 314,599.

The object of my invention is to improve the construction shown in my copending application for vacuum mixing machines, filed August 4, 1926, Serial No. 126,948. In my said machine the mixing blades and mixing trough are shown made of metal and the kind of metal used is iron which, under certain conditions, discolors the product being mixed. At times this is undesirable and very objectionable, and therefore, it is necessary to provide a structure which will not discolor the contents while being operated on, as set forth in said application. This object is accomplished by my invention, wherein I provide a peculiar set of blades and a peculiar mixing chamber which entirely eliminates the discoloring trouble above referred to. This and other objects are accomplished by my invention, one embodiment of which is hereinafter more particularly set forth.

For a more particular description of my invention, reference is to be had to the accompanying drawings, forming a part hereof, in which Figure 1 is a sectional view of a portion of a mixing machine provided with my improvement.

Figure 2 is a sectional view showing mixing blades and the mountings therefor.

Figure 3 is a perspective view of a mixing blade when removed from the shaft to which it is attached when used.

Throughout the various views of the drawings, similar reference characters designate similar parts.

My improved mixing machine has a mixing vessel 1 which is adapted to turn on trunnions 2 which are fixedly mounted to a base, not shown. Through these trunnions 2 extends a shaft 3 which is used for driving certain mechanism including the shaft 4, as set forth in my said application.

The shaft 4 is provided with a sleeve 5 which is held firmly on this shaft by means of suitable pins 6, as shown in dotted lines in Figures 1 and 2, and on this sleeve is secured a series of blades 7, each of which is formed by shaping a sheet of metal 8 and bending it into the form shown. Each blade, after being shaped into the form shown in Figure 3, or substantially thus, is secured to the sleeve 5 by welding, or any other suitable means, so that it is firmly fixed in place. The sleeve 5 and the blades 7 are formed of rustless steel or rustless iron so that under no circumstances can these blades stain the material on which they function when the mixing machine is in operation.

It is obvious that the blades 7 may be readily shaped by suitable dies and that the sleeve 5 is also shaped by means of turning and boring and grinding so that both the blades and the sleeve are readily made true and polished without hand labor, such as filing, and that after being so made the blades are readily welded in place, in the conventional manner, so that the finished job is fully, properly and carefully and accurately machined with a minimum of labor.

It is not sufficient to make the blades so that they will not discolor the contents of the mixing vessel if the walls of the mixing vessel will discolor the contents. Therefore, it is necessary to make the walls of some material which will not affect the color or physical properties of the said contents by staining or otherwise. This is accomplished by providing a lining 9 in the mixing chamber 1 of stainless steel or iron which is preferably made of sheet metal, properly shaped so as to fit said vessel and with all joints welded so as to prevent any intrusion of foreign matter or any leakage of any kind whatsoever. In the preferred embodiment of my invention, this lining 9 extends about the shaft 4, as shown in Figure 1, so that at all times all contact with any material in the mixer and iron or other contaminating material is prevented.

A machine provided with my improvement is operated precisely the same as the machine of my said application so that a further description of structure and operation is unnecessary.

While I have shown and described one embodiment of my invention, it is obvious that it is not restricted thereto, but that it is broad enough to cover all structures that come within the scope of the annexed claims.

Having thus described my invention, what I claim is:

1. In a machine of the class described, a shaft with the sleeve mounted thereon, blades fixed to the sleeve, the blades on the sleeve being made of rustless steel or iron and a mixing chamber adjacent to such blades provided with a lining made of the same material as the blades and sleeve, and having welded joints at its corners so as to make leakage impossible.

2. In a machine of the class described, a shaft with a sleeve, removable, mounted thereon, blades fixed to the sleeve, the blades being made of sheet metal and properly shaped, and the blades and sleeve being made of rustless steel or iron and a mixing chamber adjacent to said blades and provided with a lining made of the same material as the blades and sleeve, the joints of said lining being welded so as to prevent all possible leakage at the corners.

In testimony whereof, I have hereunto set my hand and seal this 22nd day of October, 1928.

EVARTS G. LOOMIS.